(12) United States Patent
Kerr et al.

(10) Patent No.: US 12,354,294 B2
(45) Date of Patent: Jul. 8, 2025

(54) POSITIONAL SYNCHRONIZATION OF VIRTUAL AND PHYSICAL CAMERAS

(71) Applicant: Apple Inc., Cupertino, CA (US)

(72) Inventors: Joel N. Kerr, San Jose, CA (US); Maneli Noorkami, Menlo Park, CA (US); Perry A. Caro, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/016,210

(22) Filed: Sep. 9, 2020

(65) Prior Publication Data

US 2021/0074014 A1 Mar. 11, 2021

Related U.S. Application Data

(60) Provisional application No. 62/897,910, filed on Sep. 9, 2019.

(51) Int. Cl.
*G06T 7/70* (2017.01)
*G06T 7/10* (2017.01)
(Continued)

(52) U.S. Cl.
CPC ............. *G06T 7/70* (2017.01); *G06T 7/10* (2017.01); *G06T 19/006* (2013.01); *H04N 5/04* (2013.01); *G06T 7/20* (2013.01)

(58) Field of Classification Search
CPC .... G06T 7/70; G06T 7/10; G06T 7/20; G06T 19/006; H04N 5/04
(Continued)

(56) References Cited

U.S. PATENT DOCUMENTS 9,754,167 B1   9/2017 Holz et al.
2008/0112699 A1*  5/2008 Huseth ............... G01S 5/02
                                                   396/89
(Continued)

FOREIGN PATENT DOCUMENTS

CN    105283824 A    1/2016
CN    107408314 A   11/2017
(Continued)

OTHER PUBLICATIONS

International Search Report and Written Opinion from PCT/US2020/050005, dated Feb. 19, 2021, 14 pages.
Japanese Office Action from Japanese Patent Application No. 2022-503014, dated Jan. 30, 2023, 8 pages including English language translation.
(Continued)

*Primary Examiner* — Wednel Cadeau
(74) *Attorney, Agent, or Firm* — BAKERHOSTETLER

(57) ABSTRACT

A device for positional synchronization of virtual and physical cameras may include a processor configured to determine a first position of a physical camera relative to another electronic device in a physical environment. The processor may be configured to initiate positioning of a virtual camera in a second position within a computer-generated environment, wherein the second position relative to a representation of the person in the computer-generated environment coincides with the first position. The processor may be configured to receive an image frame captured by the physical camera and a virtual image frame generated by the virtual camera. The processor may be configured to generate a computer-generated reality image frame that includes at least a portion of the image frame composited with at least a portion of the virtual image frame.

20 Claims, 8 Drawing Sheets

(51) Int. Cl.
   *G06T 7/20*      (2017.01)
   *G06T 19/00*     (2011.01)
   *H04N 5/04*      (2006.01)

(58) Field of Classification Search
   USPC .......................................................... 382/100
   See application file for complete search history.

(56) References Cited

U.S. PATENT DOCUMENTS

| | | | | |
|---|---|---|---|---|
| 2015/0348326 | A1* | 12/2015 | Sanders | H04N 5/275 345/633 |
| 2016/0187974 | A1* | 6/2016 | Mallinson | G06F 3/011 463/32 |
| 2016/0379415 | A1 | 12/2016 | Epeset et al. | |
| 2017/0076499 | A1 | 3/2017 | Jiang et al. | |
| 2018/0311585 | A1* | 11/2018 | Osman | A63F 13/26 |
| 2019/0065027 | A1* | 2/2019 | Hauenstein | G06F 3/04883 |
| 2023/0105064 | A1* | 4/2023 | Winston | G06T 19/006 345/633 |

FOREIGN PATENT DOCUMENTS

| | | |
|---|---|---|
| CN | 107850936 A | 3/2018 |
| CN | 108700936 A | 10/2018 |
| JP | H 07-306956 | 11/1995 |
| JP | 2019-510296 | 4/2019 |
| KR | 20170030422 | 3/2017 |

OTHER PUBLICATIONS

Korean Office Action from Korean Patent Application No. 10-2022-7002154, dated Nov. 18, 2022, 11 pages including machine-generated English language translation.
Chinese Office Action from Chinese Patent Application No. 202080054608.6, dated Mar. 19, 2024, 22 pages including machine-generated English language translation.
European Office Action from European Patent Application No. 20780449.3, dated Mar. 22, 2024, 6 pages.
Korean Notice of Allowance from Korean Patent Application No. 2022-7002154, dated Dec. 6, 2023, 8 pages including machine-generated English language translation.
Japanese Notice of Allowance from Japanese Patent Application No. 2022-503014, dated Oct. 16, 2023, 4 pages including machine-generated English language translation.
Chinese Office Action from Chinese Patent Application No. 202080054608.6, dated Oct. 26, 2024, 7 pages with English language translation.
Indian Office Action from Indian Patent Application No. 202117062200, dated Jan. 15, 2024, 7 pages.
European Office Action from European Patent Application No. 20780449.3, dated May 11, 2023, 6 pages.
Japanese Office Action from Japanese Patent Application No. 2022-503014, dated Jul. 25, 2023, 6 pages including English language translation.
Korean Office Action from Korean Patent Application No. 10-2022-7002154, dated Jun. 12, 2023, 5 pages including English language translation.
European Office Action from European Patent Application No. 20780449.3, dated Feb. 17, 2025, 4 pages.

* cited by examiner

POSITIONAL SYNCHRONIZATION OF VIRTUAL AND PHYSICAL CAMERAS

CROSS REFERENCE TO RELATED APPLICATIONS

This application claims the benefit of priority to U.S. Provisional Patent Application No. 62/897,910, entitled "Positional Synchronization of Virtual and Physical Cameras," filed on Sep. 9, 2019, the disclosure of which is hereby incorporated herein in its entirety.

TECHNICAL FIELD

The present description relates generally to computer-generated reality recording, including positional synchronization, or positional alignment, of virtual and physical cameras for generating a composite computer-generated reality recording.

BACKGROUND

Augmented reality technology aims to bridge a gap between computer-generated environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
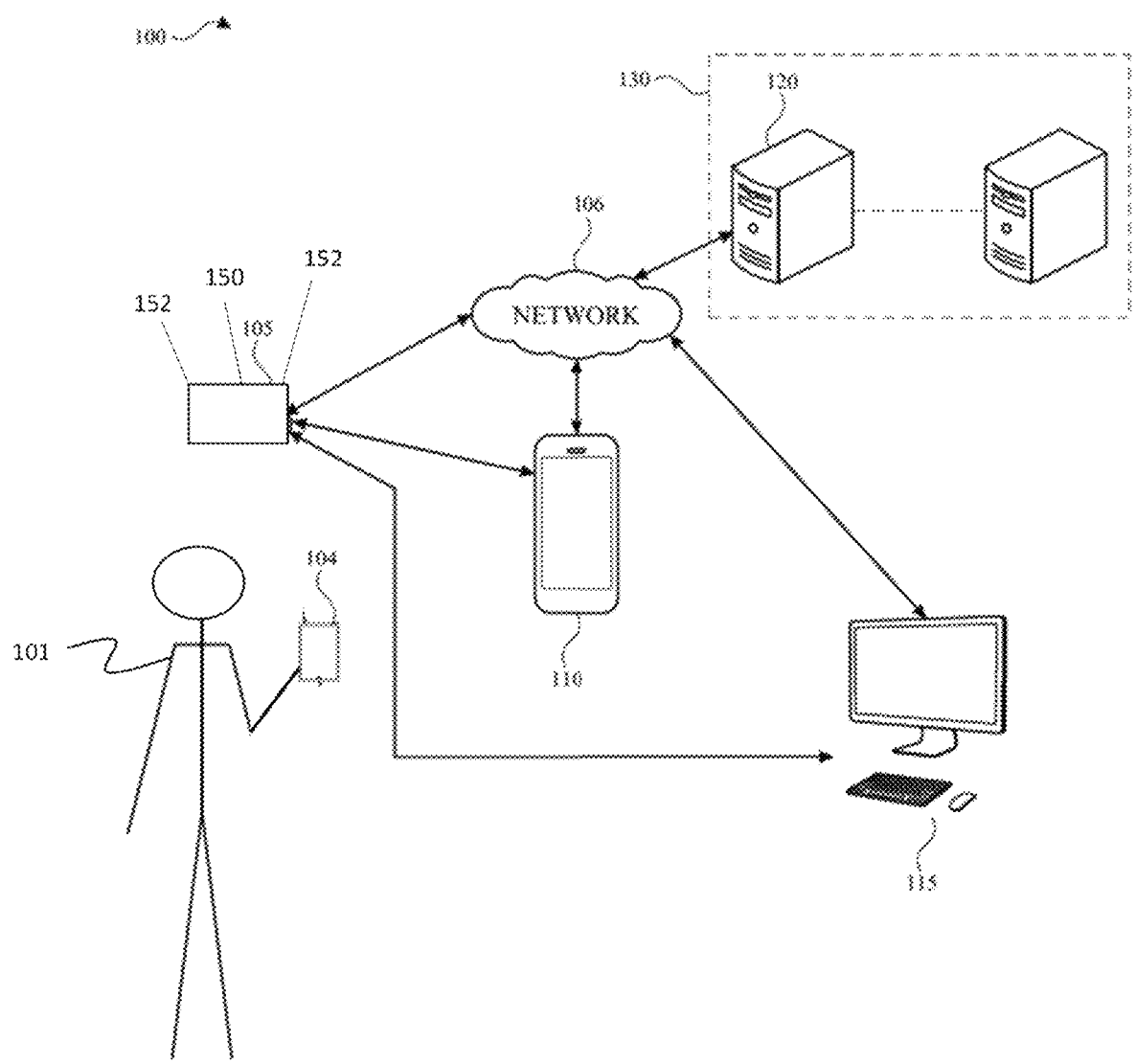
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A computer-generated reality (CGR) system enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A CGR system enables physical and computer-generated environments to be combined in varying degrees to facilitate interactions from a user in a real time manner. Such a CGR system, as described herein, therefore can include various possible combinations of physical and computer-generated environments. In this manner, a physical environment can be connected with a computer-generated environment by the CGR system. A user immersed in a computer-generated environment, e.g. via an electronic device, can navigate through such an environment and the system can track the user's viewpoint to provide a visualization based on how the user is situated in the environment. The user may be represented in the computer-generated environment by, for example, an avatar.

Virtual cameras can be positioned throughout the computer-generated environment to capture virtual images and/or videos of the user's avatar's movement throughout the computer-generated environment, while physical cameras, e.g. image capture devices, can be positioned throughout a physical environment surrounding the user to capture images and/or videos of the surrounding physical environment. The subject system facilitates positional synchronization of the virtual and physical cameras relative to the user's avatar in the computer-generated environment, and the user in the physical environment, such that virtual images captured by the virtual camera are positionally aligned, and/or perspective aligned, with physical images captured by the physical camera. In this manner, the positionally aligned, and/or perspective aligned, virtual and physical images can be composited to generate computer-generated reality images and/or recordings.

For example, the subject system can facilitate a user with synchronizing a position of a physical camera capturing images/video of the user's movement in a physical environment with a position of a virtual camera that is concurrently capturing virtual images/video of the user's avatar's movement in a computer-generated environment. In this manner, images/video of the user can be segmented from the images/video captured from the physical environment, and can be composited with the virtual images/video to generate a computer-generated reality image/recording in which the user's avatar is replaced with the images of the user in the physical environment.

The subject system can also be used to enable another user's device, such as a mobile device or tablet, to operate as a viewport into a CGR environment being experienced by the user using and/or wearing the electronic device. For example, the subject system can place a virtual camera in the CGR environment at a position that is synchronized with the position of the other user's device in the physical environment. Virtual objects can then be segmented from the virtual images and composited with physical images that are being concurrently captured by the physical camera of the other user's device to provide the other user with a viewport into the CGR environment being experienced by the user.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a handheld and/or mobile device, or as a head mounted portable system (e.g., worn by a user 101). The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for initiating a co-presence session from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 110 or the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner, such as a host environment for a co-presence session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the computer-generated reality environment. Examples of such events include detecting a presence of a particular person, entity, or object in the scene. In response to the detected event, the electronic device 105 can provide annotations (e.g., in the form of metadata) in the computer-generated reality environment corresponding to the detected event.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 8. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

In one or more implementations discussed further below with respect to FIG. 6, a user utilizing the electronic device 105, and/or utilizing the electronic device 104, to access a computer-generated reality environment may wish to generate a recording that merges images of their body in the physical environment with virtual image frames, e.g. a virtual video, generated from the computer-generated environment and/or computer-generated reality environment being provided by the electronic device 105. However, in order to composite the images of the user's body onto the virtual image frames, the position of the physical camera capturing images the user's body in the physical environment, e.g. the electronic device 110, may need to be synchronized (e.g., aligned) with the position of the virtual camera generating the virtual image frames from the computer-generated environment.

The subject system facilitates the user with the positional synchronization of the physical and virtual cameras by automatically positioning a virtual camera in the computer-generated environment in a position that coincides with a position of a physical camera in the physical environment, an example process of which is discussed further below with respect to FIG. 3, and/or by providing the user with guidance for positioning a physical camera, e.g., the electronic device 110, in the physical environment in a position that coincides with the position of a virtual camera in the computer-generated environment, an example process of which is discussed further below with respect to FIG. 4. The subject system can then composite at least a portion of the image frame captured by the physical camera with the virtual image frame generated by the virtual camera to generate a computer-generated reality image frame.

In one or more implementations discussed further below with respect to FIG. 7, when a user is using and/or wearing the electronic device 105 to access a computer-generated reality environment, another user may wish to view the computer-generated reality environment that the user is experiencing. The subject system enables the other user to use their electronic device, such as the electronic device 110, as a viewport into the computer-generated reality environment being provided by the electronic device 105, by positioning a virtual camera at a position in the computer-generated reality environment that coincides with the position of the physical camera of the other user's electronic device in the physical environment (relative to the electronic device 105). An example process of providing a viewport into a computer-generated reality environment being experienced by another user is discussed further below with respect to FIG. 5.

In one or more implementations, a user using and/or wearing the electronic device to experience a computer-generated reality environment may wish to generate a computer-generated reality image of themselves in the computer-generated reality environment (e.g., a computer-generated reality "selfie") that includes an image of their physical body from the physical environment composited with the computer-generated reality environment they are experiencing. However, in order for an image captured from the physical environment to be aligned with a virtual image generated from the computer-generated environment, the subject system positions the virtual camera in the computer-generated environment in a position that is synchronized and/or aligned with the position of the physical camera in the physical environment (relative to the electronic device 105), such that the image frames from the physical camera can be composited with the virtual image frames from the virtual camera.

For explanatory purposes, the subject system is described herein with respect to synchronize the position of one virtual camera to one physical camera. However, the subject system may be used to synchronize the position of one or more virtual cameras to one or more physical cameras. In one or more implementations, the subject system may be utilized by a user to position a virtual camera in a computer-generated environment without using any physical cameras.

Figure 2:
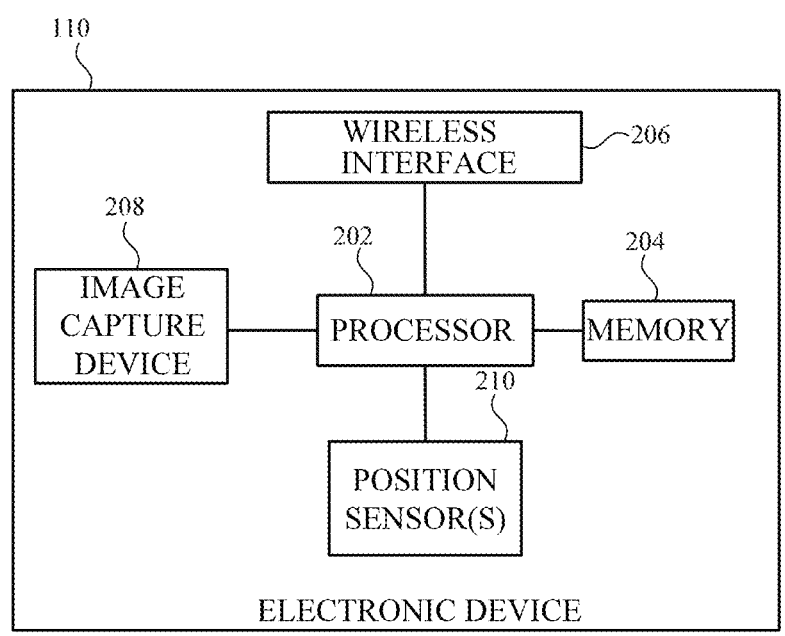
FIG. 2 illustrates an example electronic device that may be used for positional synchronization of virtual and physical cameras in accordance with one or more implementations.

FIG. 2 illustrates an example electronic device 110 that may be used for positional synchronization of virtual and physical cameras in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the electronic device 105, the electronic device 112, the electronic device 115, and/or the server 120.

The electronic device 110 may include a host processor 202, a memory 204, a wireless interface 206, an image capture device 208, and one or more position sensor(s) 210. In one or more implementations, the electronic device 110 may utilize the wireless interface 206 as a position sensor and may or may not include any additional position sensors 210.

The wireless interface 206 may include one or more antennas and one or more transceivers for transmitting/receiving wireless communications. In one or more implementations, the wireless interface 206 may be configured to perform wireless ranging operations with another device, such as the electronic device 105. The wireless ranging operations may include, for example, ranging operations performed by exchanging ultra-wideband signals (e.g., 500 Mhz signals) that provide millimeter and/or sub-millimeter positioning accuracy, such as based on a time-of-arrival and/or an angle-of-arrival determined from the exchanged signals.

The image capture device 208 may be and/or may include, for example, one or more image sensors. The image capture device 208 may further include one or more illuminating devices, such as an infrared device, a light emitting diode device, or generally any illuminating device. In one or more implementations, the image capture device 208, in part and/or in whole, may be referred to as a physical camera. In one or more implementations, the image capture device 208 may be used to determine the position of the electronic device 110 relative to another device, such as the electronic device 105. For example, one or more image sensors of the image capture device 208 may be used to generate a depth map and/to otherwise determine a depth of another device, such as the electronic device 105.

In one or more implementations, the image capture device 208 may also be used to segment an image of a user's body from an image of the physical environment. For example, one or more depth maps may be generated from images captured by multiple image sensors of the image capture device 208, and the one or more depth maps may be used to identify/segment objects in the images, such as the user.

The one or more position sensors 210 may include one or more sensors that may provide information that can be used to determine a position of the electronic device 110, such as relative to another device, e.g. the electronic device 105. For example, the one or more position sensors may include one or more gyroscopes, accelerometers, magnetometers, ultrasound transceivers, radar/lidar transceivers, or generally any sensors that may facilitate determining the position of the electronic device 110 relative to another device, such as the electronic device 105. In one or more implementations, the one or more position sensors 210 may also be used to determine an orientation of the electronic device 110, e.g., along an x, y, and/or z axis.

The host processor 202 may include suitable logic, circuitry, and/or code that enable processing data and/or controlling operations of the electronic device 110. In this regard, the host processor 202 may be enabled to provide control signals to various other components of the electronic device 110. The host processor 202 may also control transfers of data between various portions of the electronic device 110. Additionally, the host processor 202 may enable implementation of an operating system or otherwise execute code to manage operations of the electronic device 110. In one or more implementations, the host processor 202 may facilitate determining a position of the electronic device 110 relative to another device, such as the electronic device 105, using computer vision. For example, the host processor (and/or one or more remote processing units, such as at the server 120), may analyze one or more images captured by the image capture device 208 to determine a position of the electronic device 110 relative to another device shown in the one or more images, such as the electronic device 105.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the wireless interface 206, the image capture device 208, the one or more position sensors 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
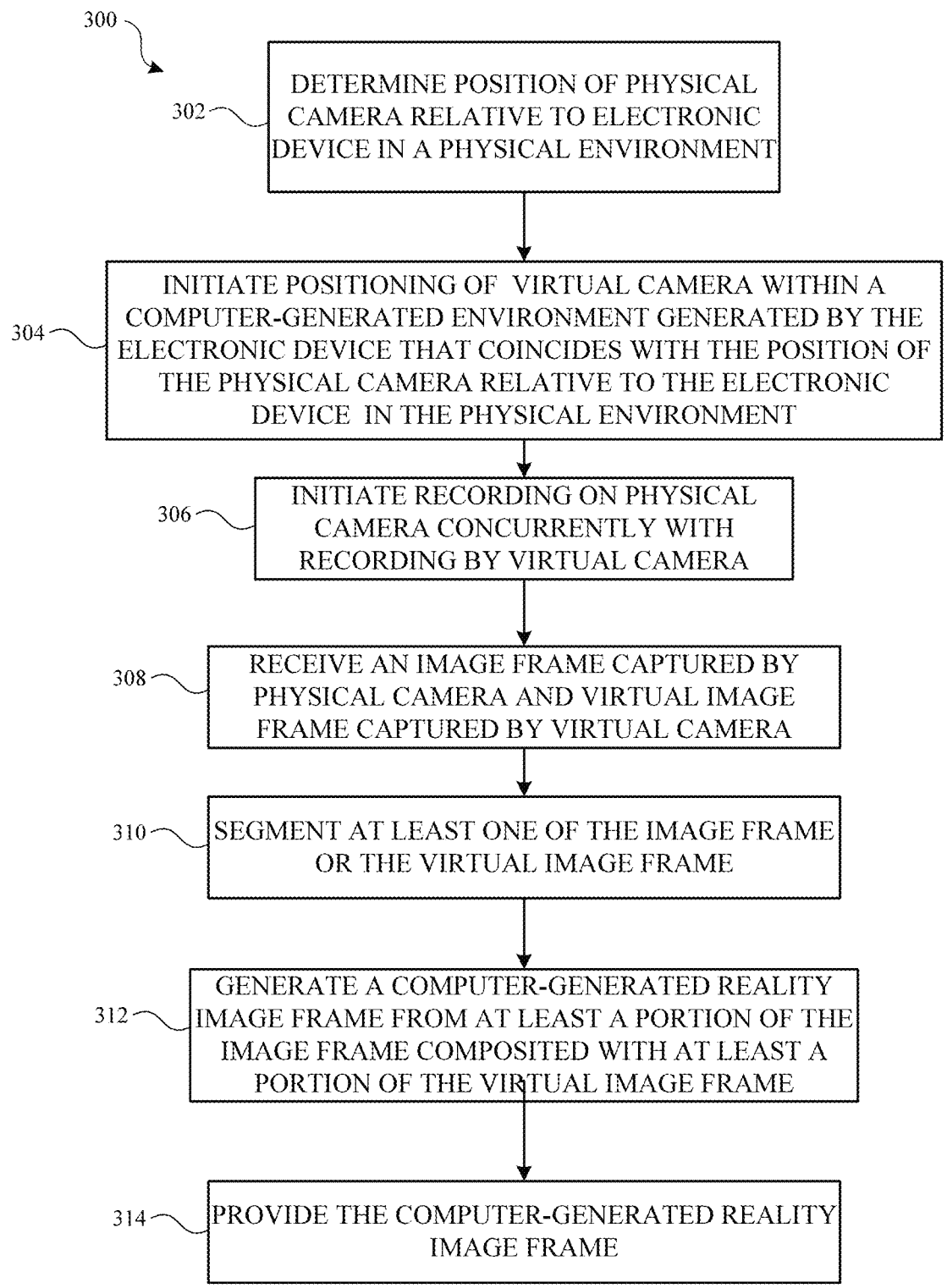
FIG. 3 illustrates a flow diagram of an example process for automatic positional synchronization of a virtual camera with respect to a physical camera in accordance with one or more implementations.

FIG. 3 illustrates a flow diagram of an example process 300 for automatic positional synchronization of a virtual camera with respect to a physical camera in accordance with one or more implementations. For explanatory purposes, the process 300 is primarily described herein with reference to the electronic device 105 of FIG. 1. However, the electronic device 105 is presented as an exemplary device and one or more of the operations described herein may be performed by any suitable device. For example, the process 300 may be performed by the electronic device 110, or generally any electronic device. Further for explanatory purposes, the operations of the process 300 are described herein as occurring in serial, or linearly. However, multiple operations of the process 300 may occur in parallel. In addition, the operations of the process 300 need not be performed in the order shown and/or one or more of the operations of the process 300 need not be performed and/or can be replaced by other operations.

The example process 300 may be initiated by a user utilizing the electronic device 105 to experience a computer-generated environment and/or computer-generated reality environment who wishes to generate a recording that merges images of their body in the physical environment with virtual image frames, e.g. a virtual video, generated from the computer-generated environment and/or computer-generated reality environment being provided by the electronic device 105. For example, the user may position another electronic device that includes a physical camera, such as the electronic device 110, such that the field of view of the physical camera includes the user using and/or wearing the electronic device 105 and/or utilizing an electronic device 104 in the physical environment, as is illustrated in FIG. 6. The user may then select a configuration option via, e.g., the electronic device 105 and/or the electronic device 110 to initiate the example process 300.

Once the example process 300 is initiated, the electronic device 105 determines a position (e.g., location and orientation) of the physical camera, such as the electronic device 110, relative to the electronic device 105 in the physical environment (302). For example, the electronic device 105 may initiate ranging operations with the physical camera, such as ultra-wideband ranging operations, when the physical camera includes a wireless interface that supports ranging operations. In one or more implementations, the electronic device 105 may utilize one or more image sensors to determine the position of the physical camera, such as by utilizing computer vision, a depth map, and/or the like. In one or more implementations, the electronic device 105 may receive, e.g. from the physical camera, the position of the physical camera relative to the electronic device 105. For example, the physical camera may include additional position sensors that can be used to determine its position relative to the electronic device 105.

The electronic device 105 may initiate positioning of a virtual camera within the computer-generated reality environment being provided by the electronic device 105 to coincide with the position of the physical camera in the physical environment relative to the electronic device 105 (304). The virtual camera may be positioned with an orientation and location that coincides with an orientation and location of the physical camera relative to the electronic device 105 such that the image frames captured by the physical camera are aligned with the virtual image frames generated by the virtual camera. For example, the position of the virtual camera relative to a virtual representation corresponding to the electronic device 105 in the computer-generated environment, such as the user's avatar, may coincide with the position and orientation of the physical camera in the physical environment relative to the electronic device 105.

The electronic device 105 may initiate recording of the physical environment by the physical camera concurrently with initiating generation of a virtual recording of the computer-generated environment by the virtual camera (306). For example, the electronic device 105 may transmit a message to the physical camera indicating a time when the physical camera should initiate recording. In one or more implementations, the recordings may not be initiated concurrently; however, the virtual and/or physical camera may be temporally synchronized such that the images can be later time aligned, e.g. based on timestamps.

The electronic device 105 may receive an image frame captured by the physical camera and a virtual image frame captured by the virtual camera (308). For example, the physical camera may stream image frames to the electronic device 105 via a wired and/or wireless connection. The electronic device 105 may segment at least one of the image frame or the virtual image frame (310). For example, the electronic device 105 may segment the image of the user from the physical image frame, such as by utilizing computer vision/object recognition, and/or by utilizing additional data corresponding to the image frame provided by the electronic device 110, such as a depth map or other information that may be used to identify and segment the image of the user from the image frame. In one or more implementations, the user may be standing in front of a uniformly colored screen, such as a green screen, that facilitates segmenting the images of the user from the image frames.

In one or more implementations, the electronic device 110 may include one or more sensors, such as multiple image sensors, that may be used to generate a depth map or otherwise generate information that may be used to segment the images of the user from the image frames. The electronic device 110 may provide the segmented images of the user to the electronic device 105, such that the electronic device 105 can bypass the segmentation and composite the segmented user images onto the virtual images.

The electronic device 105 generates a computer-generated reality frame from at least a portion of the image frame (e.g., the segmented user image) and at least a portion of the virtual image frame, such as the entirety of the virtual image frame except for the virtual representation of the user, e.g. the user's avatar (312). In one or more implementations, the electronic device 105 may overlay the image of the user onto the user's avatar in the corresponding virtual image frame to generate the computer-generated reality image frame.

The electronic device 105 the provides the computer-generated reality image frame, such as for display to the user, for local and/or remote storage, and/or for streaming to one or more other users (314). The operations 308-314 may be repeated for each image frame and corresponding virtual image frame to generate a computer-generated reality video stream. Thus, for example, the computer-generated reality image frame and/or video stream may be displayed to the user by the electronic device 105 such that the user can preview the computer-generated reality video stream and make any physical and/or virtual camera adjustments that may be necessary and/or desirable.

In one or more implementations, the electronic device 105 may continuously monitor the location of the physical camera relative to the electronic device 105 (302) and may continuously adjust the position of the virtual camera to coincide with changes in the position of the physical camera.

Thus, if another user is holding the physical camera, and the other user is moving, shaking, or is otherwise not holding the physical camera in a fixed position, the position of the virtual camera will also move and/or shake such that the entirety of the computer-generated reality image frame will reflect the movement/shaking, rather than only the physical image frame portion of the computer-generated reality image frame.

In one or more implementations, the example process 300 may be performed all, or in part, by the electronic device 110. For example, the electronic device 110 may transmit instructions to the electronic device 105 and may receive a stream of virtual image frames generated by the virtual camera positioned by the electronic device 105. In one or more implementations, at least a portion of the example process 300 may be performed by, and/or facilitated by, the server 120. For example, the server may receive image frames captured by the physical camera as well as the virtual image frames generated by the virtual image camera, may generate the computer-generated reality image frames, and may transmit the computer-generated reality image frames to the electronic device 110, the electronic device 105, and/or to one or more additional electronic devices, such as electronic devices of other users authorized to view the computer-generated reality video stream of the user.

In one or more implementations, the electronic device 105 and the physical camera, such as the electronic device 110, may both be associated with, and/or registered to, a same user account. The electronic device 105 and/or the electronic device 110 may confirm that the other device is associated with the same user account before initiating the example process 300. Alternatively, and/or in addition, the electronic device 105 and the electronic device 110 may be associated with different user accounts, and may participate in an initial pairing/authorization operation before imitating the example process 300.

Figure 4:
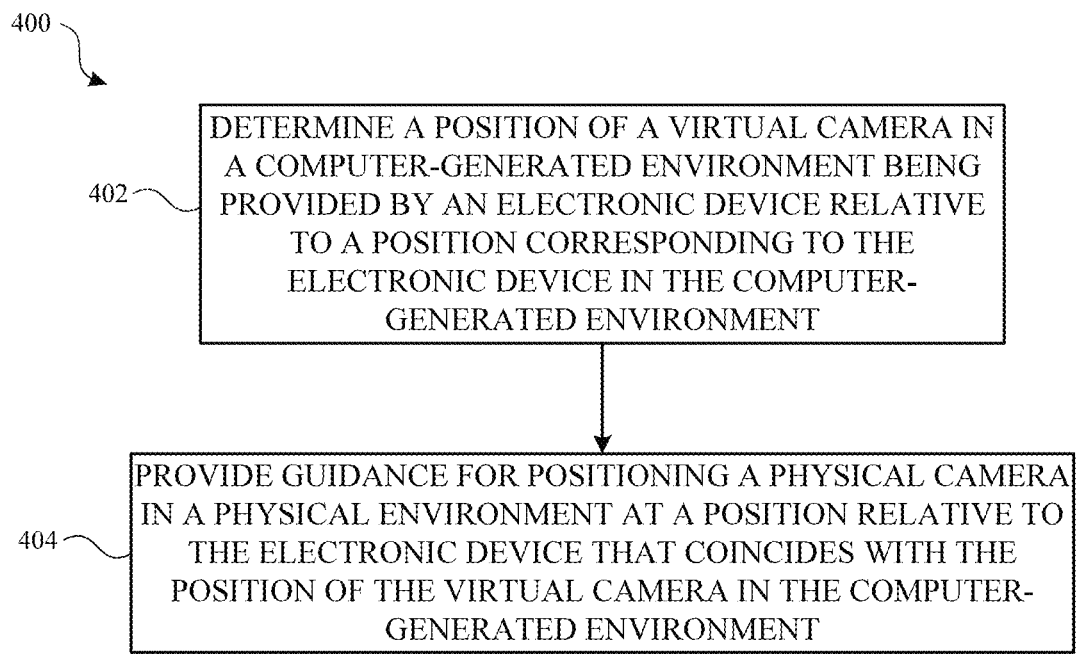
FIG. 4 illustrates a flow diagram of an example process for providing guidance for positional synchronization of a physical camera with respect to a virtual camera in accordance with one or more implementations.

FIG. 4 illustrates a flow diagram of an example process for providing guidance for positional synchronization of a physical camera with respect to a virtual camera in accordance with one or more implementations. For explanatory purposes, the process 400 is primarily described herein with reference to the electronic device 105 of FIG. 1. However, the electronic device 105 is presented as an exemplary device and one or more of the operations described herein may be performed by any suitable device. For example, the process 400 may be performed by the electronic device 110, or generally any electronic device. Further for explanatory purposes, the operations of the process 400 are described herein as occurring in serial, or linearly. However, multiple operations of the process 400 may occur in parallel. In addition, the operations of the process 400 need not be performed in the order shown and/or one or more of the operations of the process 400 need not be performed and/or can be replaced by other operations.

The example process 400 may be initiated by a user using and/or wearing the electronic device 105 to experience a computer-generated environment and/or computer-generated reality environment who wishes to generate a recording that merges images of their body in the physical environment with virtual image frames, e.g. a virtual video, generated from the computer-generated environment and/or computer-generated reality environment being provided by the electronic device 105. For example, the user may position a virtual camera within the computer-generated environment in a particular position that has a desirable angle or field of view. The process 400 may then be initiated, such as by selecting a user interface element, to facilitate the user with positioning a physical camera, such as the electronic device 110, in a position in the physical environment that coincides with the position of the virtual camera in the computer-generated environment, as is illustrated in FIG. 6.

Once the example process 400 is initiated, the electronic device 105 determines the position of the virtual camera in the computer-generated environment being provided by the electronic device 105 relative to a position corresponding to the electronic device 105 in the computer-generated environment (402). The position corresponding to the electronic device 105 in the computer-generated environment may be, for example, the position of the user's avatar in the computer-generated environment.

The electronic device 105 then provides guidance to the user for positioning the physical camera in the physical environment at a position relative to the electronic device 105 that coincides with the position of the virtual camera in the computer-generated environment (404). For example, the electronic device 105 may provide an augmented reality display to the user that indicates the position in the physical environment where the physical camera should be positioned.

In one or more implementations, the process 400 may be performed by the physical camera, such as the electronic device 110. For example, the physical camera may receive position information from the electronic device 105 and may then facilitate the user with placing the physical camera in the appropriate position in the physical environment. In one or more implementations, the physical camera may be included in an autonomously moving device, such as a drone or robotic device, that may automatically move the physical camera into the position indicated by the electronic device 105.

Figure 5:
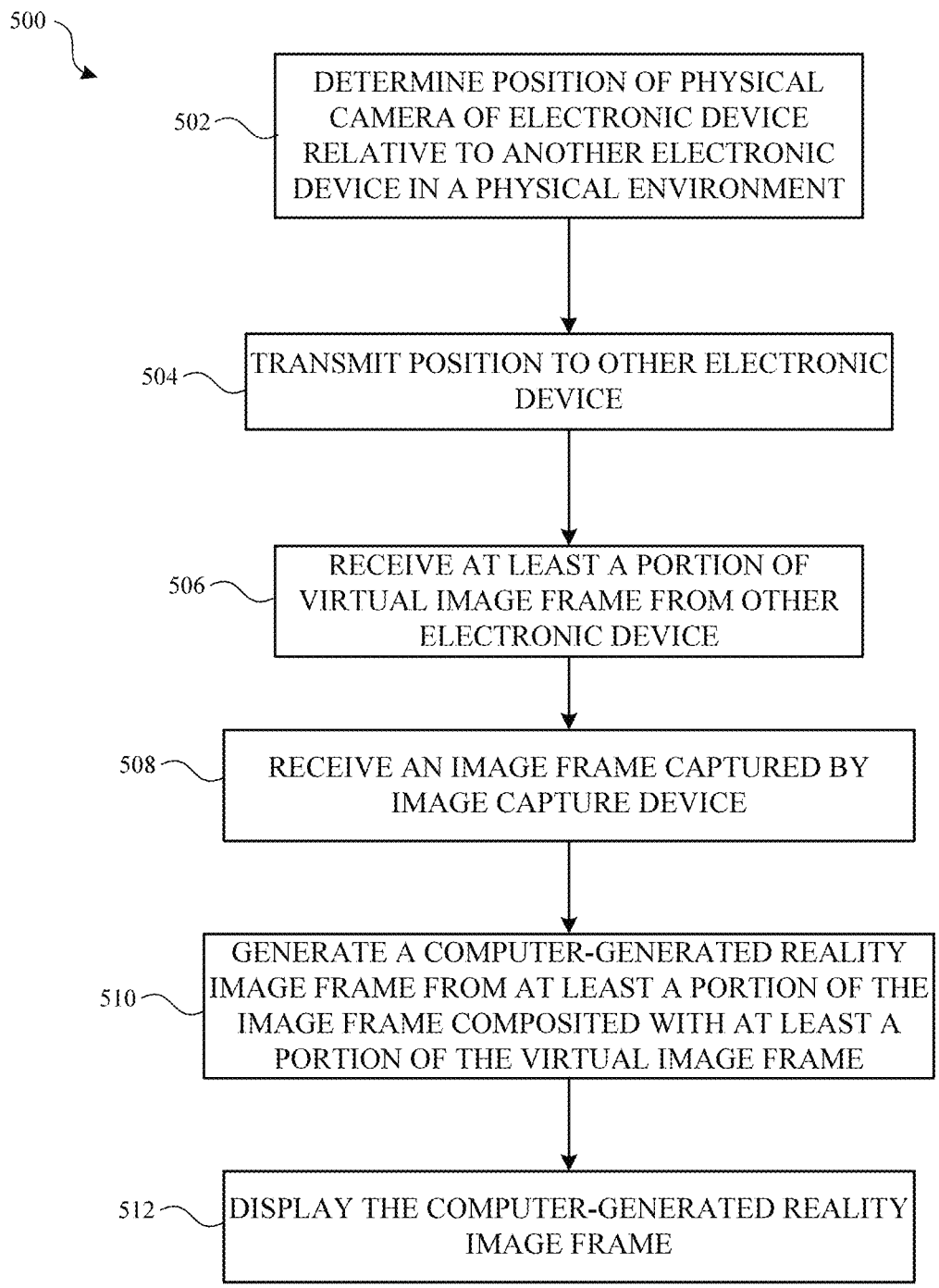
FIG. 5 illustrates a flow diagram of an example process for providing a viewport into a computer-generated reality environment in accordance with one or more implementations.

FIG. 5 illustrates a flow diagram of an example process for providing a viewport into a computer-generated reality environment in accordance with one or more implementations. For explanatory purposes, the process 500 is primarily described herein with reference to the electronic device 110 of FIG. 1. However, the electronic device 110 is presented as an exemplary device and the operations described herein may be performed by any suitable device. For example, the process 500 may be performed by the electronic device 112, or generally any electronic device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The example process 500 may be initiated when a user is experiencing a computer-generated reality environment via the electronic device 105 and another user would like to view the computer-generated reality environment. For example, as illustrated in FIG. 7, a user using and/or wearing the electronic device 105 may be playing a virtual game for which the virtual game board is positioned on (and/or adjacent to) a physical object in the physical environment, such as a table. Although the other user in the room can see the physical table, they cannot see the virtual game being played on the physical table by the user using and/or wearing the electronic device 105. Thus, the other user may request to receive, via the electronic device 110, a viewport into the computer-generated reality environment being provided by the electronic device 105.

In one or more implementations, if the electronic device 110 is registered to and/or associated with the same user account as the electronic device 105, the other user may automatically be granted access to the viewport. However, if the electronic device 110 is registered to and/or associated with a different user account than the electronic device 105, the electronic device 110 may transmit a request to the electronic device 105 for authorization to access the viewport. The electronic device 105 may, for example, present the request to the user using and/or wearing the electronic device 105 and the user may accept or decline the request.

When the electronic device 110 is granted access to the viewport into the computer-generated reality environment being generated by the electronic device 105, the electronic device 110 determines a position of the physical camera on the electronic device 110 relative to the electronic device 105 in the physical environment (502). For example, the position can be determined by performing ultra-wideband ranging operations with the electronic device 105, and/or any other suitable positioning technique described herein.

The electronic device 110 can transmit its position to the electronic device 105, and/or the electronic device 105 may determine the position of the electronic device 110 using a suitable positioning technique (504). The electronic device 105 may position a virtual camera in the computer-generated reality environment in a position that coincides with the position of the physical camera of the electronic device 110 in the physical environment.

The electronic device 110 may then receive, from the electronic device 105, at least a portion of the virtual image frame generated by the virtual camera (506). For example, the virtual camera may only capture the virtual objects in the computer-generated reality environment and/or the electronic device 105 may segment the virtual objects from the virtual image and may provide only the virtual objects to the electronic device 110. The electronic device 110 also receives an image frame captured by the physical camera of the electronic device 110 (508) and composites the at least the portion of the virtual image onto the physical image frame, such as by overlaying the at least the portion of the virtual image onto the physical image frame, to generate a computer-generated reality image frame (510).

The electronic device 110 then displays the computer-generated reality image frame on a display of the electronic device 110 to provide the viewport into the computer-generated reality environment being provided by the electronic device 105 (512). The operations 506-512 may be repeated, such as for every image frame, to display a computer-generated reality video stream that provides a real-time viewport into the computer-generated reality environment. In one or more implementations, the electronic device 105 may display an indication to the user using and/or wearing the electronic device 105, such as a red icon, that indicates that a viewport into the computer-generated reality environment is being provided to another user, such as via the electronic device 110.

Figure 6:
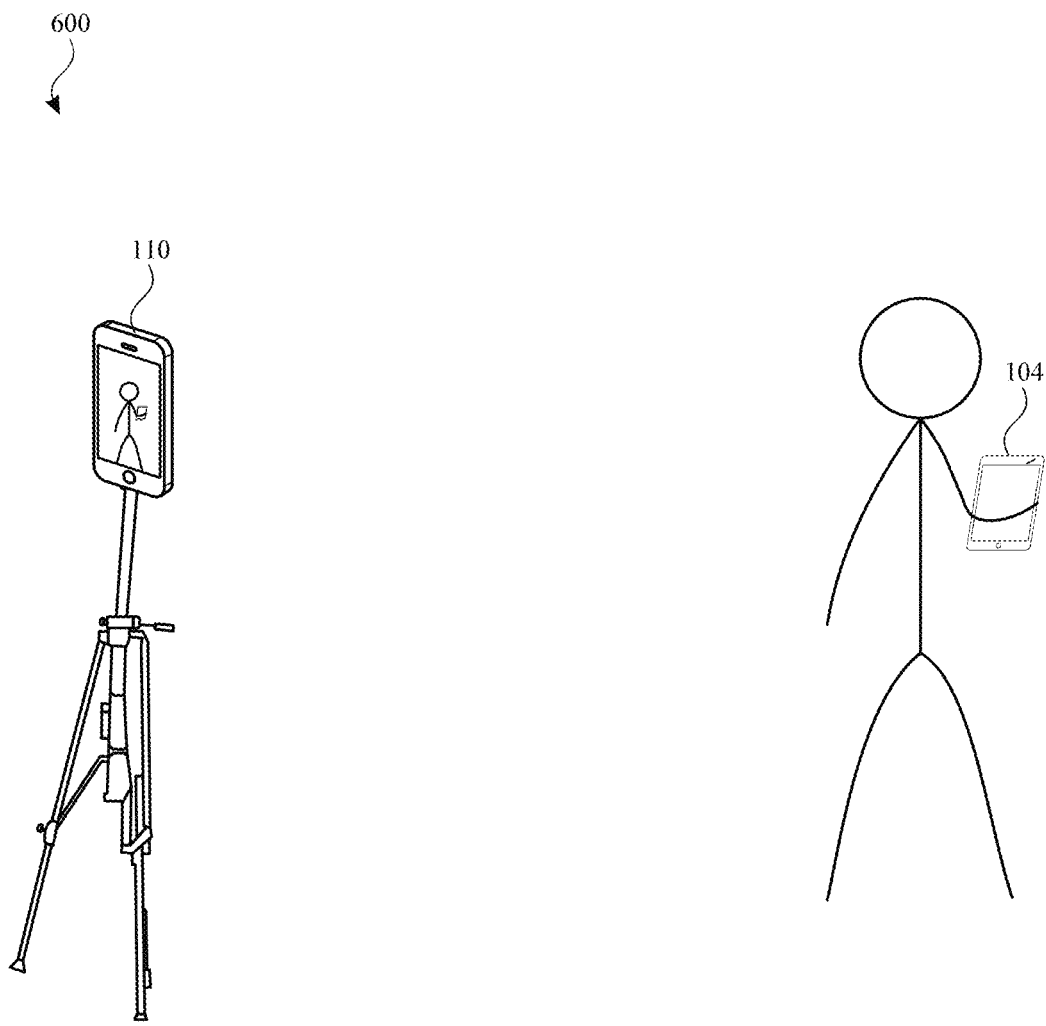
FIG. 6 illustrates an example environments in which positional synchronization of virtual and physical cameras may be implemented for computer-generated reality recording in accordance with one or more implementations.

FIG. 6 illustrates an example environment in which positional synchronization of virtual and physical cameras may be implemented for computer-generated reality recording in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example environment 600, the user has positioned the electronic device 110, which includes a physical camera, in a position for which the field of view of the physical camera encompasses the user using and/or wearing the electronic device 104 (or the electronic device 105). The electronic device 104 may then perform, for example, the process 300 described above to position a virtual camera in the computer-generated reality environment being provided by the electronic device 104. Alternatively, and/or in addition, the user may have pre-configured a position for the virtual camera in the computer-generated environment, and the process 400 may have been used to determine the appropriate position to place the electronic device 110.

Once the position of the physical camera of the electronic device 110 and the position of the virtual camera in the computer-generated environment being provided by the electronic device 104 are synchronized, the image frames captured by the physical camera can be composited with the virtual image frames generated by the virtual camera to generate one or more computer-generated reality image frames.

In one or more implementations, the physical and virtual recordings may not occur concurrently. For example, a recording with a physical camera may be made first, and then a virtual recording may be added later, or vice-versa. In this instance the positions of the virtual and physical cameras would still be synchronized in order to allow for subsequent compositing of the recordings; however, the recordings may be made asynchronously.

Figure 7:
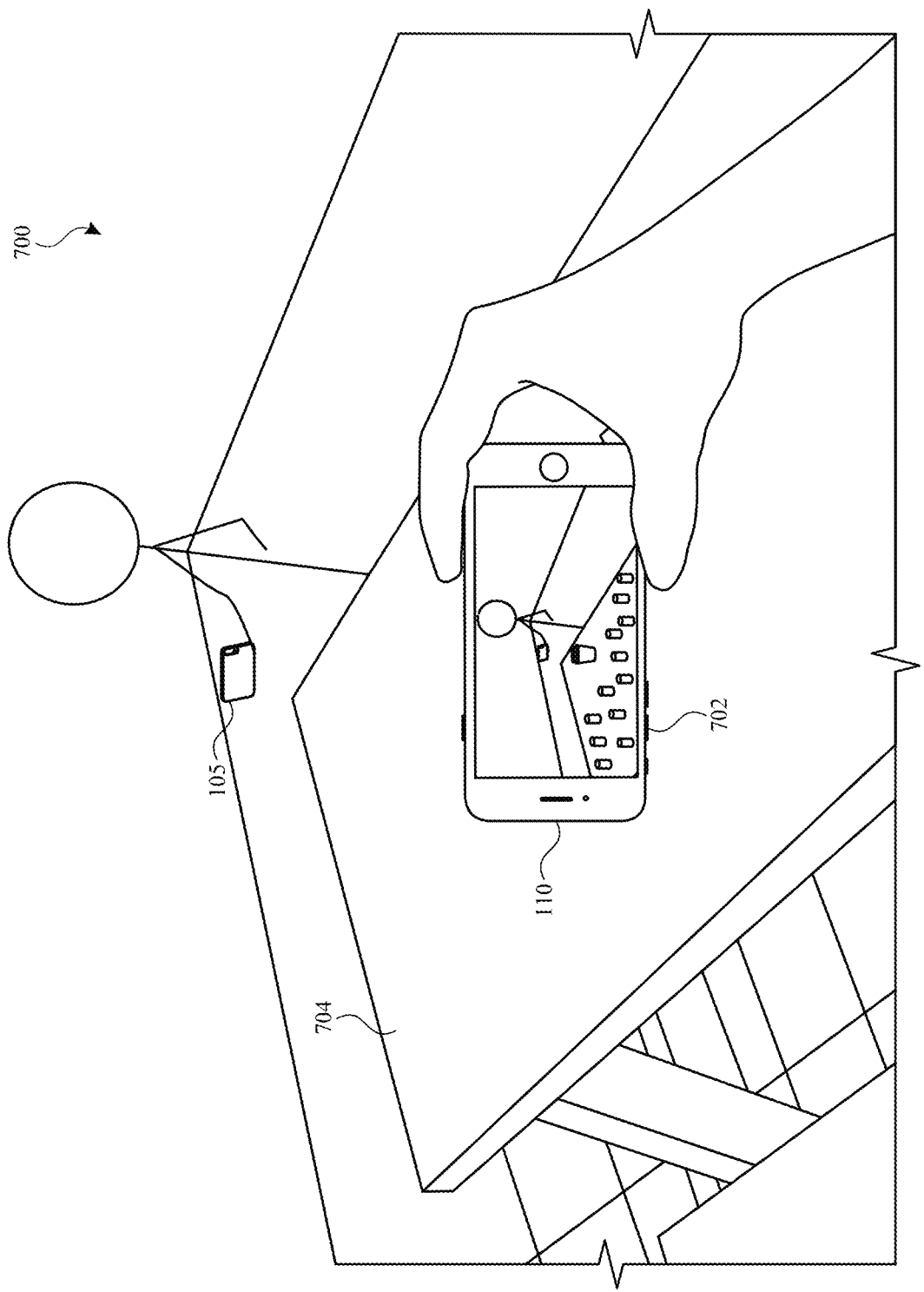
FIG. 7 illustrates an example environment in which positional synchronization of virtual and physical cameras may be implemented for providing a computer-generated reality viewport in accordance with one or more implementations.

FIG. 7 illustrates an example environment 700 in which positional synchronization of virtual and physical cameras may be implemented for providing a computer-generated reality viewport in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example environment 700, a user is using and/or wearing the electronic device 105 to experience a computer-generated reality environment that includes virtual objects positioned on, and/or adjacent to, the physical table 704. The electronic device 110 may perform, for example, the process 500 to provide another user with a viewport 702 into the computer-generated reality environment being experienced by the user using and/or wearing the electronic device 105. In one or more implementations, the image of the electronic device 105 may be removed from the computer-generated reality image frames providing the viewport and may instead be replaced with an image of the user's actual face and/or avatar.

In one or more implementations, the user using and/or wearing the electronic device 105 may be experiencing a computer-generated reality environment and/or may be participating in a co-presence session with another user. The user may wish to use the physical camera on their electronic device 110 to generate a self-captured image in the computer-generated environment, which may be colloquially referred to as a "selfie."

Thus, the electronic device 105 and/or the electronic device 110 may perform the process 300 to place a virtual camera in the computer-generated environment in a position that coincides with the position of the physical camera of the electronic device 110 in the physical environment relative to the electronic device 105. In this manner, the virtual image frame generated by the virtual camera can be composited with the image frame generated by the physical camera of the electronic device 110 to generate a mixed-reality self-captured image, or a mixed-reality selfie.

In one or more implementations, the image of the electronic device 105 may be removed from the mixed-reality image and replaced with an image of the face and/or avatar of the user using and/or wearing the electronic device 105. If the user is participating in a co-presence session with, and capturing a mixed-reality selfie of, one or more other users, the electronic devices being used and/or worn by the other users may also be replaced with the other users' faces and/or avatars in the computer-generated reality image.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 8:
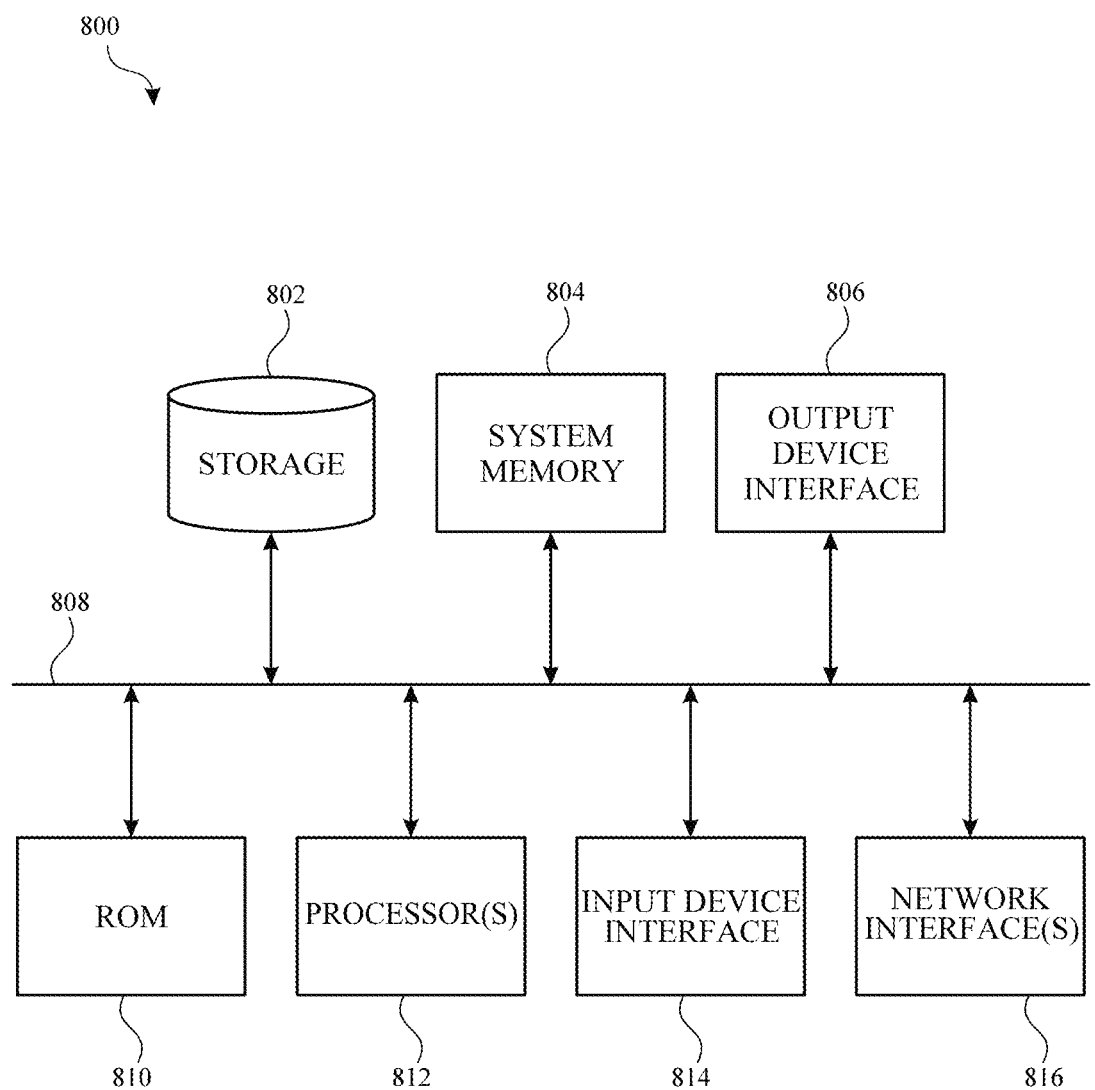
FIG. 8 illustrates an example electronic system with which aspects of the subject technology may be implemented in accordance with one or more implementations.

FIG. 8 illustrates an example electronic system 800 with which aspects of the subject technology may be implemented in accordance with one or more implementations. The electronic system 800 can be, and/or can be a part of, one or more of the electronic device 105, the electronic device 104, the electronic device 110, the electronic device 112, the electronic device 115, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A device comprising:
   a memory; and
   at least one processor configured to:
      determine a first position of a physical camera relative to the device in a physical environment, the physical camera being separate from the device;
      initiate positioning of a virtual camera in a second position within a computer-generated environment, wherein the second position of the virtual camera relative to a virtual representation corresponding to a person in the computer-generated environment is synchronized with the first position of the physical camera relative to the device in the physical environment, the person being associated with the device;

receive a plurality of image frames captured using the physical camera of the physical environment and a plurality of virtual image frames generated using the virtual camera of the computer-generated environment, the plurality of image frames capturing movement of the person and the plurality of virtual image frames capturing movement of the virtual representation; and generate a plurality of computer-generated reality image frames, each respective computer-generated reality frame comprising at least a portion of a respective image frame of the plurality of image frames composited with at least a portion of a respective virtual image frame of the plurality of virtual image frames, wherein the at least the portion of the respective image frame comprises a respective segmented image of the person that replaces the virtual representation corresponding to the person in the respective computer-generated reality image frame, the virtual representation being positionally aligned with the respective image of the person throughout the movement of the person across the plurality of image frames and the movement of the virtual representation across the plurality of virtual image frames based on the second position of the virtual camera being synchronized with the first position of the physical camera.

2. The device of claim 1, wherein the virtual representation corresponding to the person comprises an avatar of the person, a field of view of the virtual camera includes the avatar of the person, a field of view of the physical camera includes the device, and the at least one processor is further configured to:
segment the respective image of the person from the respective image frame captured using the physical camera.

3. The device of claim 1, wherein the at least one processor is further configured to:
segment a respective virtual object from the respective virtual image frame; and
composite the respective virtual object with the at least the portion of the respective image frame to generate the respective computer-generated reality image frame.

4. The device of claim 1, wherein the at least one processor is further configured to:
detect a change in the first position of the physical camera; and
responsive to the detect, initiate a change in the second position of the virtual camera to synchronize with the changed first position of the physical camera.

5. The device of claim 1, wherein the at least one processor is further configured to:
exchange one or more signals between the physical camera and the device; and
determine the first position of the physical camera in the physical environment based at least in part on one or more time of arrivals of the one more exchanged signals.

6. The device of claim 1, wherein the at least one processor is further configured to:
utilize computer vision to determine the first position of the physical camera relative to the device in a physical environment.

7. The device of claim 1, wherein the physical camera and the device are both associated with an account of the person and the device comprises at least one of the physical camera or the device.

8. The device of claim 1, wherein the at least one processor is further configured to:
display the respective computer-generated reality image frame.

9. The device of claim 2, wherein the at least one processor is further configured to:
composite the respective segmented image of the person with the at least the portion of the respective virtual image frame to generate the respective computer-generated reality image frame, the respective segmented image of the person replacing the avatar of the person in the respective computer-generated reality image frame.

10. The device of claim 3, wherein the respective virtual object comprises another avatar of another user in the computer-generated environment.

11. The device of claim 3, wherein the computer-generated environment comprises a computer-generated reality environment and the respective virtual object is displayed in the computer-generated reality environment as adjacent to a physical object in the physical environment.

12. A method comprising:
determining, by a device, a first position of a physical camera relative to the device in a physical environment, the physical camera being separate from the device;
initiating positioning of a virtual camera in a second position within a computer-generated environment, wherein the second position of the virtual camera relative to a virtual representation corresponding to a person in the computer-generated environment is synchronized with the first position of the physical camera relative to the device in the physical environment, the person being associated with the device;
receiving a plurality of image frames captured using the physical camera of the physical environment and a plurality of virtual image frames generated using the virtual camera of the computer-generated environment, the plurality of image frames capturing movement of the person and the plurality of virtual image frames capturing movement of the virtual representation; and
generating a plurality of computer-generated reality image frames, each respective computer-generated reality frame comprising at least a portion of a respective image frame of the plurality of image frames composited with at least a portion of a respective virtual image frame of the plurality of virtual image frames, wherein the at least the portion of the respective image frame comprises a respective segmented image of the person that replaces the virtual representation corresponding to the person in the respective computer-generated reality image frame, the virtual representation being positionally aligned with the respective image of the person throughout the movement of the person across the plurality of image frames and the movement of the virtual representation across the plurality of virtual image frames based on the second position of the virtual camera being synchronized with the first position of the physical camera.

13. The method of claim 12, wherein the virtual representation corresponding to the person comprises an avatar of the person, a field of view of the virtual camera includes the avatar of the person, a field of view of the physical camera includes the device, and the method further comprises:
segmenting the respective image of the person from the respective image frame captured using the physical camera.

14. The method of claim 12, further comprising:
segmenting a respective virtual object from the respective virtual image frame; and
compositing the respective virtual object with the at least the portion of the respective image frame to generate the respective computer-generated reality image frame.

15. The method of claim 12, further comprising:
detecting a change in the first position of the physical camera; and
responsive to the detecting, initiating a change in the second position of the virtual camera to synchronize with the changed first position of the physical camera.

16. The method of claim 13, further comprising:
compositing the respective segmented image of the person with the at least the portion of the respective virtual image frame to generate the respective computer-generated reality image frame, the respective segmented image of the person replacing the avatar of the person in the respective computer-generated reality image frame.

17. The method of claim 14, wherein the respective virtual object comprises another avatar of another user in the computer-generated environment.

18. A non-transitory machine-readable medium comprising instructions that, when executed by one or more processors, cause the one or more processors to perform operations comprising:
determining, by a device, a first position of a physical camera relative to the device in a physical environment, the physical camera being separate from the device;
initiating positioning of a virtual camera in a second position within a computer-generated environment, wherein the second position of the virtual camera relative to a virtual representation corresponding to a person in the computer-generated environment is synchronized with the first position of the physical camera relative to the device in the physical environment, the person being associated with the device;
receiving a plurality of image frames captured using the physical camera of the physical environment and a plurality of virtual image frames generated using the virtual camera of the computer-generated environment, the plurality of image frames capturing movement of the person and the plurality of virtual image frames capturing movement of the virtual representation; and
generating a plurality of computer-generated reality image frames, each respective computer-generated reality frame comprising at least a portion of a respective image frame of the plurality of image frames composited with at least a portion of a respective virtual image frame of the plurality of virtual image frames, wherein the at least the portion of the respective image frame comprises a respective segmented image of the person that replaces the virtual representation corresponding to the person in the respective computer-generated reality image frame, the virtual representation being positionally aligned with the respective image of the person throughout the movement of the person across the plurality of image frames and the movement of the virtual representation across the plurality of virtual image frames based on the second position of the virtual camera being synchronized with the first position of the physical camera.

19. The non-transitory machine-readable medium of claim 18, wherein the virtual representation corresponding to the person comprises an avatar of the person, a field of view of the virtual camera includes the avatar of the person, a field of view of the physical camera includes the device, and the operations further comprise:
segmenting the respective image of the person from the respective image frame captured using the physical camera.

20. The non-transitory machine-readable medium of claim 19, wherein the operations further comprise:
compositing the respective segmented image of the person with the at least the portion of the respective virtual image frame to generate the respective computer-generated reality image frame, the respective segmented image of the person replacing the avatar of the person in the respective computer-generated reality image frame.

\* \* \* \* \*